United States Patent
Wu

(10) Patent No.: US 7,452,560 B2
(45) Date of Patent: Nov. 18, 2008

(54) PROCESS FOR PREPARING A HAND-HELD SNACK ITEM, AND THE PRODUCT THEREOF

(75) Inventor: Rei-Young Amos Wu, Palatine, IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 10/988,801

(22) Filed: Nov. 15, 2004

(65) Prior Publication Data

US 2005/0074527 A1 Apr. 7, 2005

Related U.S. Application Data

(63) Continuation of application No. 09/928,591, filed on Aug. 13, 2001, now Pat. No. 6,821,537, which is a continuation of application No. 09/617,445, filed on Jul. 17, 2000, now Pat. No. 6,303,163, which is a continuation of application No. 08/805,484, filed on Feb. 26, 1997, now abandoned.

(51) Int. Cl.
*A21D 13/00* (2006.01)

(52) U.S. Cl. .................. 426/89; 426/94; 426/289; 426/291; 426/293; 426/296; 426/302; 426/618

(58) Field of Classification Search ............... 426/89, 426/94, 289, 290, 618, 619, 620
See application file for complete search history.

(56) References Cited

U.S. PATENT DOCUMENTS

| | | | |
|---|---|---|---|
| 3,544,332 A | 12/1970 | Leebens | |
| 4,038,423 A | 7/1977 | Hayward et al. | |
| 4,281,593 A | 8/1981 | Gevaert | |
| 4,313,706 A | 2/1982 | Danford | |
| 4,328,741 A | 5/1982 | Yoshikazu | |
| 4,451,488 A | 5/1984 | Cook et al. | |
| 4,539,211 A | 9/1985 | Armando et al. | |
| 4,592,916 A | 6/1986 | Akesson | |
| 4,734,289 A | 3/1988 | Yamaguchi et al. | |
| 4,888,180 A | 12/1989 | Wu | |
| 4,913,919 A * | 4/1990 | Cornwell et al. | 426/94 |
| 5,102,677 A | 4/1992 | Van Den Berghe | |
| 5,196,215 A | 3/1993 | Yokoyama et al. | |
| 5,275,831 A | 1/1994 | Smith et al. | |
| 5,372,826 A | 12/1994 | Holtz et al. | |
| 5,376,395 A | 12/1994 | Pels | |
| 5,490,998 A | 2/1996 | Kim et al. | |
| 5,510,130 A | 4/1996 | Holtz et al. | |
| 5,707,448 A | 1/1998 | Cordera et al. | |
| 5,709,896 A * | 1/1998 | Hartigan et al. | 426/103 |
| 5,709,902 A | 1/1998 | Bartolomei et al. | |
| 5,846,587 A | 12/1998 | Kelly et al. | |
| 6,303,163 B1 | 10/2001 | Wu | |
| 6,821,537 B2 | 11/2004 | Wu | |
| 6,846,502 B1 * | 1/2005 | Billmers et al. | 426/289 |

OTHER PUBLICATIONS

F. Hsieh, H.E. Huff, I.C. Peng and S.W. Marek: Puffing Rice Cakes as Influenced by Tempering and Heating Conditions, Journal of Food Science, 1989, 54(5) 1310-1312.

* cited by examiner

*Primary Examiner*—Lien Tran
(74) *Attorney, Agent, or Firm*—Banner & Witcoff, Ltd.

(57) ABSTRACT

A method for preparing a hand-held snack item is disclosed. The method includes the steps of (a) applying a first edible, heat-sensitive food material to an initial formed hand-held food item, thereby forming a preliminary coated hand-held food item; (b) applying a second edible food coating material to said preliminary coated hand-held food item, thereby forming a secondary coated hand-held food item, wherein said second edible food material is applied to said preliminary coated hand-held food item in such a manner as to substantially completely coat said first edible, heat-sensitive food material, and wherein said second edible food material is selected from a material which possesses sufficient physical characteristics to act as a protective medium for said first edible, heat-sensitive food material when said secondary coated hand-held food item is subjected to a temperature in the range of from about 35° C. to about 350° C. for a period of time in the range of from about 10 hours to about 30 seconds; and (c) subjecting said secondary coated hand-held food item to a temperature in the range of from about 35° C. to about 350° C. for a period of time in the range of from about 10 hours to about 30 seconds, thereby producing a final, coated hand-held snack item wherein said first edible, heat-sensitive food material is substantially intact.

10 Claims, No Drawings

PROCESS FOR PREPARING A HAND-HELD SNACK ITEM, AND THE PRODUCT THEREOF

CROSS-REFERENCE TO RELATED APPLICATIONS

This is a continuation of U.S. patent application Ser. No. 09/928,591, filed Aug. 13, 2001 now U.S. Pat. No. 6,821,537 which is a continuation of U.S. application Ser. No. 09/617,445, filed Jul. 17, 2000, now U.S. Pat. No. 6,303,163B1, which is a continuation of U.S. patent application Ser. No. 08/805,484, filed Feb. 26, 1997, now abandoned.

FIELD OF INVENTION

The present invention relates to a process for preparing a hand-held snack item wherein a heat-sensitive food material is applied to the surface of the snack item. In one embodiment of the present invention, the heat-sensitive food material is first applied to the surface of the hand-held snack item, which is then coated with a second coating. After the second coating is applied to the snack item, it is then subjected to a heating operation. The heat-sensitive food material remains substantially intact even when subjected to the heating operation because the second coating acts as a protective coating. The present invention further relates to the product of this process.

BACKGROUND OF INVENTION

Hand-held snack items and methods for producing them are well known in the art. Examples of such snack items include granola bars, breakfast bars, cereal bars, and grain cakes such as rice cakes, corn cakes and popcorn cakes. The grain cakes are made by a method wherein the grain is expanded in an enclosed chamber in the shape of a disk or cake. In a typical method a premeasured quantity of grain is fed onto a heated piston. The piston and cereal grain are then advanced by a hydraulic cylinder into a heated female mold to create a small, hermetically sealed chamber enclosing the cereal grains. Heat and superatmospheric pressure are thereby applied to the cereal grains until, at a predetermined time, the pressure in the chamber is suddenly released by retracting the hydraulic cylinder. The suddenly depressurized chamber is not, however, sufficiently opened to release the cereal grains, but instead the hydraulic cylinder is retained in a substantially closed, but vented position. Therefore, as the pressure is released, the cereal grains expand to substantially fill the chamber, and while still in the plastic state bond together to form a small cake or cracker. The hydraulic piston is then fully retracted to open the chamber, and the cake is mechanically ejected. These cake-forming devices are most frequently used with rice as the cereal grain since rice is capable of relatively easy expansion into a self-supporting cake.

One issue concerning such hand-held snack items is their appearance. The snack items often have an unremarkable appearance, usually due to the fact that they are prepared from grains. One way to improve the appearance of such snack items to make them more appealing is to attach attractive food items to their surface. For example, chocolate chips could be attached to their surface.

Additionally, a complaint often raised concerning such hand-held products, and especially grain cake such as rice cakes, is that they have little or no flavor. To address the flavor concern, especially for grain cakes, flavored versions of grain cakes have been introduced into the marketplace. Examples of such flavored grain cakes include butter flavored, caramel flavored, cheese flavored and chocolate flavored grain cakes. However, the grain cakes could be even further improved by attaching flavoring agents, such as chocolate chips, cinnamon powder, etc., to the surface of the grain cakes.

One problem encountered when developing these more appealing hand-held snack items, including the improved grain cakes, is that until now edible heat-sensitive flavoring materials, such as chocolate chips and cinnamon powder, could not be used. This is because in the processing of such snack items, and especially the grain cakes, the snack items would have to be coated with heat-sensitive food materials and then dried in a heated oven. The heat of the oven in this drying step has prevented the use of heat-sensitive food materials in that they would not be protected and would melt during such a heating operation. It is therefore an object of the present invention to provide a hand-held snack item, and especially a grain product, that has heat-sensitive food materials, including flavoring materials, applied thereto. The present invention further provides a method for preparing such hand-held snack items.

BACKGROUND ART

U.S. Pat. No. 4,451,488, issued May 29, 1984, to Cook et al., discloses a shelf stable, intermediate moisture, food bar having a soft and chewy texture with good taste. This is a chewy granola bar-type product.

U.S. Pat. No. 4,888,180, issued Dec. 19, 1989, to Wu, discloses an improved grain cake, method and apparatus. In the disclosed method, a predetermined quantity of cereal grains are heated in a hermetically sealed chamber at superatmospheric pressure. The heated grains are then expanded while they are confined to the chamber by abruptly releasing the superatmospheric pressure such that the confined, expanded grains bond together to form a self-supporting mass. In this method the cereal grains are pretreated by adding water to the cereal grains to bring their moisture content into the range of about 12% to about 18%. The moistened cereal grains are then steamed to bring them to an effective temperature to partially gelatinize the starch therein and to maintain the cereal grains at the effective temperature for an effective period of time to produce the desired degree of expansion in the final product. The steamed cereal grains are then dried to a moisture content of less than 18%.

U.S. Pat. No. 54,328,741, issued May 11, 1982, to Yoshikazu, discloses a method and apparatus for making shaped grain products. The disclosed method comprises the steps of compressing and heating for a predetermined time a raw material such as rice or the like. The raw material is compressed and heated within a hermetically closed chamber defined in upper and lower baking molds. After the predetermined time has elapsed, the compressed and heated raw material is expanded instantaneously by opening the baking molds and concurrently discharging steam produced within the chamber during the compression under heating. The expanded material is compressed again by means of the baking molds, thereby shaping the material into a cracker of desired form and self-sustaining structure.

U.S. Pat. No. 5,376,395, issued Dec. 27, 1994, to Pels, discloses a cooking machine and method. The disclosed method comprises introducing a cookable mixture into a molding volume having opposed ends; confining the volume of the molding volume; introducing heat for a predetermined cooking cycle; allowing expansion of the molding volume for a short predetermined period; and opening the molding volume adjacent each end simultaneously and extracting the cooked article.

U.S. Pat. No. 5,102,677, issued Apr. 7, 1992, to Van Den Berghe, discloses an apparatus and method for producing pressure-baked, cake-like products from a raw granular cereal material. The disclosed method comprises first providing a baking device comprising: a heatable mold means having a cavity for baking a predetermined quantity of the raw material and capable of assuming open, closed, or expansion positions; a heatable punch means selectively movable in and out of said mold cavity for applying a pressure to the raw material; a first jack means for selectively driving said punch means in and out of said mold cavity for causing said mold means to assume said open or closed position; and a second jack means for partially driving said punch means out of said mold cavity for causing said mold means to assume said expansion position. A predetermined quantity of raw material is fed into the baking device. The mold means is then closed by actuating the first jack means, thereby moving the punch means in the mold cavity. The raw material is next heated and compressed for a preset time period in the mold cavity. Next the mold means is caused to assume the expansion position by actuating the second jack means, thereby partially withdrawing the punch means from the mold cavity. The heated and compressed raw material is then allowed to expand for a preset time period to form a cake-like product. The mold means is opened by actuating the first jack means, thereby withdrawing the punch means from the mold cavity. Finally, the pressure-baked cake-like product is removed from between the mold means and the punch means.

However, none of these references teach or suggest the method of the present invention which provides for a hand-held snack item, and especially a grain cake product, having heat-sensitive food materials applied thereto. Nor do such references teach a method whereby a heat-sensitive food material is applied to a hand-held snack item, followed by a second material which acts to protect such heat-sensitive food material during a subsequent heating operation, thereby allowing the heat-sensitive food material to remain substantially intact. Nor do such references teach a hand-held snack item prepared by such a method.

It is therefore an object of the present invention to provide such a method. It is a further object of the present invention to provide such a product.

These objects are accomplished by the invention described herein.

SUMMARY OF THE INVENTION

The present invention relates to a method for preparing a hand-held snack item, said method comprising:
(a) applying a first edible, heat-sensitive food material to an initial formed hand-held food item, thereby forming a preliminary coated hand-held food item;
(b) applying a second edible food coating material to said preliminary coated hand-held food item, thereby forming a secondary coated hand-held food item, wherein said second edible food material is applied to said preliminary coated hand-held food item in such a manner as to substantially completely coat said first edible, heat-sensitive food material, and wherein said second edible food material is selected from a material which possesses sufficient physical characteristics to act as a protective medium for said first edible, heat-sensitive food material when said secondary coated hand-held food item is subject to a temperature in the range of from about 35° C. to about 350° C. for a period of time in the range of from about 10 hours to about 30 seconds; and
(c) subjecting said secondary coated hand-held food item to a temperature in the range of from about 35° C. to about 350° C. for a period of time in the range of from about 10 hours to about 30 seconds, thereby producing a final, coated hand-held snack item wherein said first edible, heat-sensitive food material is substantially intact.

The present invention further relates to a hand-held snack item prepared by the method described herein.

The present invention relates to a further method for preparing a hand-held snack item, said method comprising:
(a) preparing a primary edible, liquid food coating material comprising from about 10% to about 90% by weight of a viscosity providing agent, from about 5% to about 80% by weight flavoring ingredients, from 0% to about 90% by weight bulking substance, from 0% to about 30% by weight fatty acid glycerides, and the balance being water;
(b) combining said primary edible, liquid food coating material with an edible, heat-sensitive food ingredient at a ratio of about 10:1 to about 0.5:1 (primary edible, liquid food coating material: edible, heat-sensitive food ingredient), thereby forming a secondary edible, liquid food coating material;
(c) applying said secondary edible, liquid food coating material to an initial formed hand-held food item, thereby forming a coated hand-held food item, wherein said secondary edible, liquid food coating material is applied to said initial formed hand-held food item in such a manner as to substantially completely coat said edible, heat-sensitive food ingredient as it is applied to the initial formed hand-held food item as part of said secondary edible, liquid food coating material, and wherein said primary edible, liquid food coating material possesses sufficient physical characteristics to act as a protective medium for said edible, heat-sensitive food ingredient when said coated hand-held food item is subjected to a temperature in the range of from about 35° C. to about 350° C. for a period of time in the range of from about 10 hours to about 30 seconds; and
(d) drying said coated hand-held food item in an oven by subjecting said coated hand-held food item to a temperature in the range of from about 35° C. to about 350° C. for a period of time in the range of from about 10 hours to about 30 seconds, thereby producing a final, coated hand-held snack item wherein said edible, heat-sensitive food ingredient is substantially intact.

The present invention further relates to a hand-held snack item prepared by such further method as described herein.

DETAILED DESCRIPTION OF THE INVENTION

The method of the present invention provides a hand-held snack item, preferably a grain cake product, having a first edible, heat-sensitive food material applied thereto. The heat-sensitive food material is substantially intact on such hand-held snack item, despite the fact that the hand-held snack item is subjected to heating after the edible, heat-sensitive food material is applied to the snack item. This is accomplished by the method of the present invention.

In the method of the present invention a first edible, heat-sensitive food material is applied to an initial formed hand-held food item, preferably an initial formed grain cake, thereby forming a preliminary coated hand-held food item, preferably a preliminary formed grain cake. The initial formed hand-held food item may be in any number of forms that can be coated with a heat-sensitive food material and subsequently subjected to a heating operation, all of which will be appreciated by those skilled in the art. Examples of initial formed hand-held food items useful in the present invention include, but are not limited to, granola bars, cereal bars, breakfast bars, and grain cakes, with grain cakes being preferred. Regardless of the form of the initial formed hand-held food item, it can be prepared by standard methods known by those skilled in the art for preparing such snack items. As an example, granola bars can be prepared by the method disclosed in U.S. Pat. No. 4,451,488 issued May 29, 1984, to Cook et al., the disclosure of which is incorporated herein in its entirety.

The preferred initial formed grain cake is of the general type described in U.S. Pat. Nos. 4,888,180, 4,328,741, 5,376, 395, and 5,102,677, the disclosures of which are incorporated herein in their entirety. The preferred initial formed grain cake may be produced by any method known to those skilled in the art for producing such grain cakes, including without limitation the methods disclosed in the above-identified U.S. patents.

The preferred initial formed grain cake can be made from any grain known to those skilled in the art as being useful for preparing such grain cakes. Such grains are generally disclosed in the above-identified U.S. patents. Examples of useful grains include, without limitation, rice, corn, popcorn, wheat, buckwheat, rye, starches and modified starches, and mixtures thereof, with rice, corn and popcorn being preferred, and rice being more preferred.

The first edible, heat-sensitive food material used in the present invention may be selected from any known edible, heat-sensitive food material. Examples of edible, heat sensitive food materials useful in the present invention include, without limitation, chocolate chips, cheese and dairy products, fruit pieces, cinnamon, chocolate powder, cocoa, pieces of nuts, sesame seeds, pieces of ham, pieces of bacon, and mixtures thereof, with chocolate chips, cheese and dairy pieces, fruit pieces, cinnamon, and mixtures thereof being preferred, and chocolate chips and cheeses being more preferred.

The first edible, heat-sensitive food material may be applied to the initial formed hand-held food item by any method known to those skilled in the art. Of course, as will be appreciated by those skilled in the art, the particular method of application employed will depend in part on the type of material which comprises the first edible, heat-sensitive food material. As a non-limiting example, if the first edible, heat-sensitive food material comprises larger pieces such as chocolate chips, cheeses or fruit pieces, a belt feeder may be used to feed the pieces to the initial formed hand-held food item. In this application method the initial formed hand-held food items are conveyed along a first conveyor belt. The heat-sensitive pieces are conveyed along a second conveyor that is elevated above the first conveyor. The second conveyor is oriented in such a manner that the initial formed hand-held food items pass under the terminating edge of the second conveyor, thereby allowing the heat-sensitive pieces being conveyed on the second conveyor to drop onto the tops of the initial formed hand-held food items on the lower, first conveyor. This is the preferred method of applying the heat-sensitive pieces to the initial formed hand-held food items. Other examples include applying the heat-sensitive food material using vibratory trays or by first charging the heat-sensitive food material into a hopper having a dispenser located over the first conveyor belt carrying the initial formed hand-held food items. As the initial formed hand-held food item passes under the hopper, the heat-sensitive pieces are discharged onto the top of the hand-held food item. If the edible, heat-sensitive food material comprises a fine powder, for example cinnamon, then the hopper method described would be the preferred method as well.

Optionally, a sticky coating can be applied to the initial formed hand-held food item before the edible, heat-sensitive food material is applied to the hand-held food item. The edible, heat-sensitive food material is then applied on top of the sticky coating that has already been applied to the initial formed hand-held food item. The sticky coating provides for improved adhesion of the pieces to the initial formed hand-held food item. However, this method is not preferred due to the additional process steps and potential costs of the ingredients.

By "heat-sensitive" for the first edible, heat-sensitive food material, it is meant that heat will degrade the organoleptic properties of the food material, such as flavor, aroma, color, texture and/or aftertaste. This degradation in the organoleptic properties typically occurs due to the evaporation of flavor and discoloration or chemical altering (e.g., Maillard reaction, caramelization, oxidation condensation reaction, etc.) of the first edible, heat-sensitive food material due to the heating operation.

The preliminary coated hand-held food item typically comprises from about 1% to about 50%, preferably from about 5% to about 40%, more preferably from about 8% to about 30% by weight of the first edible, heat-sensitive food material, with the balance comprising the initial formed hand-held food item.

When the initial formed hand-held food item is a preferred grain cake, the preliminary coated hand-held food item (i.e., preliminary grain cake) typically comprises from about 1% to about 40%, preferably from about 5% to about 30%, more preferably from about 10% to about 20% by weight of the first edible, heat-sensitive food material, with the balance comprising the initial formed hand-held food item (i.e., initial formed grain cake).

After the preliminary coated hand-held food item is prepared, a second edible food coating is applied to the preliminary coated hand-held food item, thereby forming a secondary coated hand-held food item. The second edible food coating is applied in such a manner so as to substantially completely coat the first edible, heat-sensitive food material. This is important because the second edible food coating acts as a protective shield for the first edible, heat-sensitive food material when the secondary coated hand-held food item is subjected to a heating operation. As already discussed, the protective shielding prevents or limits the degradation of the organoleptic properties of the first edible, heat-sensitive food material. To achieve this, the second edible food coating is selected from a material, or comprises a composition of materials, which possesses sufficient physical properties and characteristics to so act in such a heat protective manner when the secondary coated hand-held food item is subjected to a temperature in the range of from about 35° C. to about 350° C., preferably from about 75° C. to about 250° C., more preferably from about 125° C. to about 175° C., for a period of time in the range of from about 10 hours to about 30 seconds, preferably from about 60 minutes to about 60 seconds, more preferably from about 10 minutes to about 5 minutes. Such properties and characteristics include the ability to give off latent heat during the heating operation, thereby maintaining the secondary coated hand-held food item at a stable, and sufficiently low temperature, during the heating operation, and also forming a film shield to maintain the integrity of the first edible, heat-sensitive food material.

Any second edible food coating material known to those skilled in the art as possessing such properties may be used in the present invention. Examples of second edible food coating materials useful in the present invention include, but are not limited to, a liquid syrup composition; powder coatings that liquefy upon heating and then evaporate to absorb heat, thereby providing a protective effect; and mixtures thereof, with a liquid syrup composition being preferred.

The individual ingredients used to prepare the preferred liquid syrup composition of the present invention will include those ingredients that, when combined in such a liquid syrup composition, will provide a syrup having the heat protective properties described herein. A preferred liquid syrup composition comprises from about 10% to about 90%, preferably from about 20% to about 80%, more preferably from about 30% to about 70% by weight of a viscosity providing agent, from about 5% to about 80%, preferably from about 5% to about 70%, more preferably from about 5% to about 30% by weight flavoring ingredients, from 0% to about 90%, preferably from 0% to about 80%, more preferably from about 20% to about 70% by weight bulking substance, from 0% to about 30%, preferably from about 1% to about 20%, more preferably from about 1% to about 10% by weight fatty acid glycerides, with the balance being water. Examples of viscosity providing agents useful in the present invention include, but are not limited to, soluble or dispersible sweeteners such as sucrose, glucose, fructose and corn syrup; gums; pectin; starch; and mixtures thereof; with sweeteners being preferred for sweet hand-held snack items; and sucrose being more preferred for sweet hand-held snack items; and gum being preferred for savory hand-held snack items. Examples of flavor ingredients useful in the present invention include, but are not limited to, salt, cocoa powder, cheese powder, natural and artificial flavoring agents, and mixtures thereof. Examples of bulking substances useful in the present invention include, but are not limited to, starch, cellulose fiber, bean fiber, and mixtures thereof, with starch being preferred. The starch is preferred because it serves two functions of providing viscosity to the syrup and acting as a bulking substance. Examples of fatty acid glycerides useful in the present invention include, but are not limited to, vegetable oil, sunflower oil, safflower oil, cottonseed oil, canola oil, soybean oil, and mixtures thereof, with vegetable oil and sunflower oil being preferred.

Any ingredient known to those skilled in the art as being useful in a syrup composition may be optionally included in the preferred liquid syrup composition, provided that such optional ingredients do not cause the resulting liquid syrup composition to lose the heat-protective properties described herein.

A more preferred liquid syrup composition comprises from about 50% to about 70% by weight sucrose, from about 5% to about 15% by weight flavoring ingredients, from about 1% to about 6% by weight vegetable oil, and the balance being water.

If the second edible food coating is in the form of a liquid syrup composition, it may be prepared by any method known to those skilled in the art. In a non-limiting example, a slurry tank is initially filled with liquid sucrose or water and sucrose to prepare an initial mixture. A desired quantity of cocoa powder is added to the initial mixture, which is then mixed to disperse the cocoa powder, thereby forming a secondary mixture. Salt is then added to the secondary mixture, which is mixed to disperse the salt, thereby forming a tertiary mixture. A desired oil is next added to the tertiary mixture, which is mixed to disperse the oil, thereby forming a quaternary mixture. Finally, flavoring ingredients are added to the quaternary mixture, forming a final syrup mixture. The final syrup mixture is then maintained at a desired temperature until it is applied to the primary coated hand-held food item.

As the preliminary coated hand-held food items pass under the depositing device, the second edible food coating material is discharged onto the tops of the preliminary coated hand-held food items, thereby forming the secondary coated hand-held food items. The second edible food coating material may be applied to the preliminary coated hand-held food item by any method known to those skilled in the art. Of course, as will be appreciated by those skilled in the art, the particular method of application employed will depend in part on the type of material, or composition of materials, the second edible food coating material may comprise. For example, if the second edible food coating material comprises a powder, its method of application may be different than if it comprises a liquid syrup. As a non-limiting example of one such application method, the preliminary coated hand-held food items are conveyed along a conveyor belt. This can be the same conveyor belt on which the initial formed hand-held food items are conveyed when the first edible, heat-sensitive food material is applied to the initial formed hand-held food items. The second edible food coating material is transferred from the slurry tank to a depositing device located over the conveyor belt carrying the preliminary coated hand-held food items. Any depositing device known to those skilled in the art as being useful for depositing materials may be used in the present invention. Of course, as will be appreciated by one skilled in the art, the particular type of depositing devices to be used will depend to a degree on the form of the second edible food coating material. If the second edible food coating material is a liquid syrup, the depositing device is preferably a sprayer. The sprayer typically either has spraying nozzles or rotating dispensing discs to apply the syrup onto the preliminary coated hand-held food item. If the second edible food coating is in the form of a dry powder, or other dry material, a hopper would typically be used to deposit the dry material. Of course, even if the second edible food coating material comprises a liquid syrup, a hopper could be used to deposit the syrup, although the hopper may have to be modified to be able to accommodate the liquid syrup.

The secondary coated hand-held food item resulting from the application of the second edible food coating material to the preliminary coated hand-held food item typically comprises from about 5% to about 65%, preferably from about 10% to about 60%, more preferably from about 15% to about 30% by weight of said first edible, heat-sensitive food material; and from about 10% to about 80%, preferably from about 20% to about 70%, more preferably from about 30% to about 60% by weight of said second edible food coating material, with the balance comprising the initial formed hand-held food item.

In an alternative preparation method, a primary edible, liquid food coating material is prepared. The primary edible, liquid food coating material has the same compositional and property characteristics as the preferred liquid syrup composition embodiment of the second edible food coating material already described herein, including the preferred embodiments and optional ingredients. The primary edible, liquid food coating material is combined with an edible, heat-sensitive food ingredient, thereby forming a secondary edible, liquid food coating material. The edible, heat-sensitive food ingredient is the same as the edible, heat-sensitive food material already described herein for preparing the preliminary coated hand-held food item, including the preferred embodiments. The ratio of primary edible, liquid food coating material to edible, heat-sensitive food ingredient is in the range of from about 10:1 to about 0.5:1, preferably from about 8:1 to about 1:1, more preferably from about 6:1 to about 3:1 (primary edible, liquid food coating material: edible, heat-sensitive food ingredient). The secondary edible, liquid food coating material is then applied to an initial formed hand-held food item, thereby forming a coated hand-held food item. The initial formed hand-held food item is the same as already described herein, including its preferred embodiments. The secondary edible, liquid food coating material is applied to the initial formed hand-held food item in such a manner as to substantially completely coat the edible, heat-sensitive food ingredient as it is applied to the hand-held food item as part of the secondary edible, liquid food coating material. The secondary edible, liquid food coating material may be applied in the manner as already described herein for applying the preferred liquid syrup composition embodiment of the second edible food coating material, including the preferred embodiments.

The coated hand-held food item resulting in this alternative method from the application of the secondary edible, liquid food coating material to the preliminary coated hand-held food item typically comprises from about 70% to about 10%, preferably from about 60% to about 20%, more preferably from about 50% to about 30% by weight of said secondary edible, liquid food coating material, with the balance comprising the initial formed hand-held food item.

The secondary coated hand-held food item, as well as the coated hand-held food item, are subjected to a heating operation, thereby forming final, coated hand-held snack items, wherein the first edible, heat-sensitive food material, and the edible, heat-sensitive food ingredient, respectively, are substantially intact. When the second edible food coating material is in the form of a liquid syrup, the heating operation acts to dry the second edible food coating material. For the alternative embodiment described herein, the secondary edible, liquid food coating material is dried in the heating operation. The drying is accomplished by passing the secondary coated hand-held food item, or alternatively the coated, hand-held food item of the alternative embodiment, through a dryer. In the dryer the secondary coated hand-held food item, and the coated, hand-held food item of the alternative embodiment, are subjected to a temperature in the range of from about 35° C. to about 350° C., preferably from about 75° C. to about 250° C., more preferably from about 125° C. to about 175° C., for a period of time in the range of from about 10 hours to about 30 seconds, preferably from about 60 minutes to about 60 seconds, more preferably from about 10 minutes to about 2 minutes. As will be appreciated by those skilled in the art, the lower temperatures set forth above usually correspond to a longer period of time, and vice-versa. The above-described conditions apply whether drying the secondary coated hand-held food item or the coated hand-held food item of the alternative embodiment described herein.

Before entering the dryer, the secondary coated hand-held food item prepared using a liquid syrup second edible food coating material typically has a moisture content in the range of from about 10% to about 90%, preferably from about 20% to about 70%, more preferably from about 30% to about 50% by weight. In the dryer the moisture content of such a hand-held food item is typically reduced to within the range of from about 0.5% to about 6%, preferably from about 1% to about 5%, more preferably from about 2% to about 4% by weight. Any type of dryer known to those skilled in the art may be used to dry the secondary coated hand-held food item. Examples of dryers useful in the present invention include, but are not limited to, direct and indirect heat convection ovens, impingement ovens, microwave ovens, and infrared ovens, with direct and indirect heat convection ovens and impingement ovens being preferred, and indirect heat convection ovens being more preferred.

When the second edible food coating material is in a form other than a liquid syrup, for example a powder form, the heating operation acts to cure the second edible food coating material. As used herein, "cure" means to liquefy the coating and then have it form a solid film upon drying. In such a heating operation, the curing is typically accomplished by passing the secondary coated hand-held food item through a convection oven. In the convection oven the secondary coated hand-held food item is subjected to a temperature in the range of from about 80° C. to about 250° C., preferably from about 90° C. to about 200° C., more preferably from about 100° C. to about 150° C., for a period of time in the range of from about 60 minutes to about 30 seconds, preferably from about 30 minutes to about 60 seconds, more preferably from about 6 minutes to about 2 minutes. As with the drying for the hand-held food item prepared using the liquid syrup, the lower temperatures set forth above usually correspond to a longer period of time, and vice-versa. The above-described conditions apply whether drying the secondary coated hand-held food item or the coated hand-held food item.

Before entering the oven, the secondary coated hand-held food item that is prepared using a second edible food coating material other than a liquid syrup typically has a moisture content in the range of from about 6% to about 2%, preferably from about 5% to about 3%, more preferably from about 4.5% to about 3.5% by weight. In the oven the moisture content of such a hand-held food item is typically reduced to within the range of from about 5% to about 1%, preferably from about 4% to about 2%, more preferably from about 3.5% to about 2.5% by weight.

The final coated hand-held food item is typically packaged and sold in retail channels.

While not intending to be bound by theory, it is unexpected and surprising that the final coated hand-held food item of the present invention could be coated with an edible, heat-sensitive coating material and yet have such heat-sensitive coating remain substantially intact, despite being subjected to a heating operation.

The present invention is further illustrated, but not limited by, the following examples.

EXAMPLES

Example 1

A liquid syrup composition is prepared containing the following ingredients:

| INGREDIENT | AMOUNT (WEIGHT) |
| --- | --- |
| Water | 65.0 kg |
| Sucrose | 130.0 kg |
| Cocoa powder | 13.6 kg |
| Sodium chloride | 2.3 kg |
| Vegetable oil | 6.8 kg |
| Chocolate flavor | 9.5 kg |
| TOTAL | 227.2 kg |

The liquid syrup composition is prepared as follows. A 500 liter slurry tank is initially filled with 195 kg. of 140° F. liquid sucrose. The liquid sucrose consists of 130 kg. of sucrose and 65 kg. of water. 13.6 kg. of cocoa powder is added to the liquid sucrose in the slurry tank, thereby forming a primary mixture. The primary mixture is next mixed using a propeller agitator mixer on low speed for a period of 5 minutes, thereby dispersing the cocoa powder substantially homogeneously throughout the primary mixture. 2.3 kg. of salt is then added to the primary mixture in the slurry tank, thereby forming a secondary mixture. The secondary mixture is next mixed using the propeller agitator mixer on high speed for a period of 10 minutes, thereby dispersing the salt substantially homogeneously throughout the secondary mixture. 6.8 kg. of vegetable oil is then added to the secondary mixture in the slurry tank, thereby forming a tertiary mixture. The tertiary mixture is next mixed using the propeller agitator mixer on high speed for a period of 5 minutes, thereby dispersing the vegetable oil substantially homogeneously throughout the tertiary mixture. 9.5 kg. of chocolate flavor is then added to the tertiary mixture in the slurry tank, thereby forming a final syrup mixture. The final syrup mixture is next mixed using the propeller agitator mixer on high speed for a period of 5 minutes, thereby dispersing the chocolate flavor substantially homogeneously throughout the final syrup mixture. The final syrup mixture is maintained at a temperature in the range of from about 60-66° C.

1.5 grams of chocolate chips is applied to the top of a plain rice cake having a weight of 9 grams, a diameter of 10 cm, and a thickness of 1.5 cm., thereby producing a primary coated rice cake. The chocolate chips are applied to the top of the plain rice cake from a belt feeder. 6 grams of the final syrup mixture is next applied to the top of the primary coated rice cake, thereby producing a secondary coated rice cake. The final syrup mixture is applied to the surface of the plain rice cake with a liquid sprayer. The secondary coated rice cake is then dried at a temperature of 150° C. for a period of time of 7.5 minutes, thereby producing a final, coated rice cake product having a moisture content of 3% by weight. The temperature of the chocolate chips during the drying step remains below their melting point of 38° C. The final, coated rice cake product is packaged in a plastic bag.

Example 2

A liquid syrup composition is prepared containing the following ingredients:

| INGREDIENT | AMOUNT (WEIGHT) |
| --- | --- |
| Water | 74.0 kg |
| Sucrose | 130.0 kg |
| Cocoa powder | 13.6 kg |
| Sodium chloride | 2.3 kg |
| Vegetable oil | 6.8 kg |
| Chocolate flavor | 9.5 kg |
| Chocolate chips | 57.0 kg |
| TOTAL | 293.2 kg |

The liquid syrup composition is prepared as follows. A 500 liter slurry tank is initially filled with 130 kg. of sucrose and 74 kg. of 24° C. water, thereby forming liquid sucrose. 13.6 kg. of cocoa powder is added to the liquid sucrose in the slurry tank, thereby forming a primary mixture. The primary mixture is next mixed using a propeller agitator mixer on low speed for a period of 5 minutes, thereby dispersing the cocoa powder substantially homogeneously throughout the primary mixture. 2.3 kg. of salt is then added to the primary mixture in the slurry tank, thereby forming a secondary mixture. The secondary mixture is next mixed using the propeller agitator mixer on high speed for a period of 10 minutes, thereby dispersing the salt substantially homogeneously throughout the secondary mixture. 57.0 kg. of chocolate chips are then added to the secondary mixture in the slurry tank, thereby forming a tertiary mixture. The tertiary mixture is next mixed using the propeller agitator mixer on high speed for a period of 5 minutes, thereby suspending the chocolate chips substantially homogeneously throughout the tertiary mixture. 6.8 kg. of vegetable oil is then added to the secondary mixture in the slurry tank, thereby forming a quaternary mixture. The quaternary mixture is next mixed using the propeller agitator mixer on high speed for a period of 5 minutes, thereby dispersing the vegetable oil substantially homogeneously throughout the quaternary mixture. 9.5 kg. of chocolate flavor is then added to the tertiary mixture in the slurry tank, thereby forming a final syrup mixture. The final syrup mixture is next mixed using the propeller agitator mixer on high speed for a period of 5 minutes, thereby dispersing the chocolate flavor substantially homogeneously throughout the final syrup mixture. The final syrup mixture is maintained at a temperature in the range of from about 15-27° C.

7.5 grams of the final syrup mixture is next applied to the surface of a plain rice cake having a weight of 9 grams, the diameter of 10 cm, and a thickness of 1.5 cm., thereby producing a primary coated rice cake. The final syrup mixture is applied to the surface of the plain rice cake with a liquid sprayer. The primary coated rice cake is then dried at a temperature of 150° C. for a period of time of 7.5 minutes, thereby producing a final, coated rice cake product having a moisture content of 3% by weight. The temperature of the chocolate chips during the drying step remains below their melting point of 38° C. The final, coated rice cake product is packaged in a plastic bag.

What is claimed is:

1. A method for preparing a hand-held snack item, comprising:
    applying a first edible, heat-sensitive food material to an initial formed hand-held food item, thereby forming a preliminary coated hand-held food item;
    applying a protective coating of cocoa powder to said preliminary coated hand-held food item thereby forming a secondary coated hand-held food item, wherein said cocoa powder substantially completely coats said edible, heat-sensitive food material, the cocoa powder capable of curing by liquefying when heated and drying as a solid film to protect the edible, heat-sensitive food material when subjected to a temperature effective for liquefying the cocoa powder and drying;
    subjecting said secondary coated hand-held food item to the temperature effective for liquefying the cocoa powder; and
    drying the liquefied cocoa powder to produce a final, coated hand-held snack item wherein the edible, heat-sensitive food material is substantially intact.

2. The method of claim 1 wherein said subjecting comprises subjecting said secondary coated hand-held food item to a temperature in the range of from about 35° C. to about 350° C. for a period of time in the range of from 30 seconds to about 10 hours, thereby producing a final, hand-held snack item wherein the edible, heat-sensitive food material is substantially intact.

3. The method of claim 2 wherein said subjecting comprises subjecting said secondary coated hand-held food item to a temperature in the range of from about 80° C. to about 250° C. for a period of time in the range of from 30 seconds to about 60 minutes, thereby producing a final, hand-held snack item wherein the edible, heat-sensitive food material is substantially intact.

4. The method of claim 3 wherein said subjecting comprises subjecting said secondary coated hand-held food item to a temperature in the range of from about 90° C. to about 200° C. for a period of time in the range of from 30 seconds to about 60 minutes, thereby producing a final, hand-held snack item wherein the edible, heat-sensitive food material is substantially intact.

5. The method of claim 4 wherein said subjecting comprises subjecting said secondary coated hand-held food item to a temperature in the range of from about 100° C. to about 150° C. for a period of time in the range of from 2 minutes to about 6 minutes, thereby producing a final, hand-held snack item wherein the edible, heat-sensitive food material is substantially intact.

6. A method according to claim 1 wherein the preliminary coated hand-held food item is conveyed along a first conveyor and the cocoa powder is applied via a hopper elevated above the first conveyor and oriented in such a manner that the preliminary coated hand-held food item passes under the hopper allowing the cocoa powder to drop onto the top of the preliminary coated hand-held food item.

7. A method according to claim 1 wherein said secondary coated edible food item is dried to contain from about 2% to about 6% moisture.

8. A method according to claim 7 wherein said secondary coated edible food item is dried to contain from about 3% to about 5% moisture.

9. A method according to claim 8 wherein said secondary coated edible food item is dried to contain from about 3.5% to about 4.5% moisture.

10. The method of claim 1 wherein said secondary edible hand-held food item comprises about 5% to 65% by weight of said first edible, heat-sensitive food material and about 10% to 80% by weight of said second edible food coating material.

* * * * *